United States Patent [19]

Pooley

[11] Patent Number: 4,497,778
[45] Date of Patent: Feb. 5, 1985

[54] MICROBIAL LEACHING OF SULPHIDE-CONTAINING ORES

[75] Inventor: Frederick D. Pooley, Holmacre, United Kingdom

[73] Assignee: University College Cardiff Consultants Limited, Cardiff, United Kingdom

[21] Appl. No.: 577,884

[22] Filed: Feb. 7, 1984

Related U.S. Application Data

[63] Continuation-in-part of Ser. No. 365,958, Jun. 4, 1982, abandoned.

[30] Foreign Application Priority Data

Apr. 6, 1981 [GB] United Kingdom ............... 8110736
Apr. 7, 1981 [GB] United Kingdom ............... 8110861
Mar. 3, 1982 [GB] United Kingdom ............... 8208091
Mar. 30, 1982 [GB] United Kingdom ............... 8209248

[51] Int. Cl.$^3$ .............................................. C01G 5/00
[52] U.S. Cl. ........................................ 423/27; 423/47;
423/98; 423/109; 423/110; 423/131; 423/150;
423/154; 423/DIG. 17; 75/6; 75/101 R; 75/118 R; 435/168; 435/252

[58] Field of Search ................. 423/27, DIG. 17, 153,
423/154, 467 R, 150, 47, 98, 109, 110, 131;
75/101 R, 118 R; 435/168, 252

[56] References Cited

U.S. PATENT DOCUMENTS 679,330  7/1901  Peterson ................................. 75/6
709,482  9/1902  Gutensohn .............................. 75/6
4,177,067 12/1979 Pepper .............................. 75/118 R

OTHER PUBLICATIONS

Tiorinen, "Use of Micro-Organisms for the Recovery of Metals" Int. Metallurgical Reviews, (1974) vol. 19, pp. 21-31.
Canadian Metallurgical Quarterly, vol. 11, No. 2 (1972) pp. 388-399.
Roman, Mineral Science Engineering vol. 5 No. 1 Jan., 1973, pp. 3-24.

Primary Examiner—John Doll
Assistant Examiner—Robert L. Stoll
Attorney, Agent, or Firm—Cushman, Darby & Cushman

[57] ABSTRACT

A process of extracting metals from a material containing at least 10% by weight of pyrite and selected from the group consisting of ores containing sulphide, concentrates of such ores and mixtures of such ores and/or concentrates by microbial leaching which comprises roasting the material before the microbial leaching to convert part of the pyrite to pyrrhotite and thus remove part of the sulphur which is present as pyrite without the formation of any significant amount of metal oxide, the conversion corresponding to removal of at least 10% but not more than 50% of the sulphur present in the pyrite, and only thereafter leaching the thus roasted ore by treatment with bacteria, to extract the metals. The process is characterized by its improved efficiency in metal extraction.

19 Claims, 1 Drawing Figure

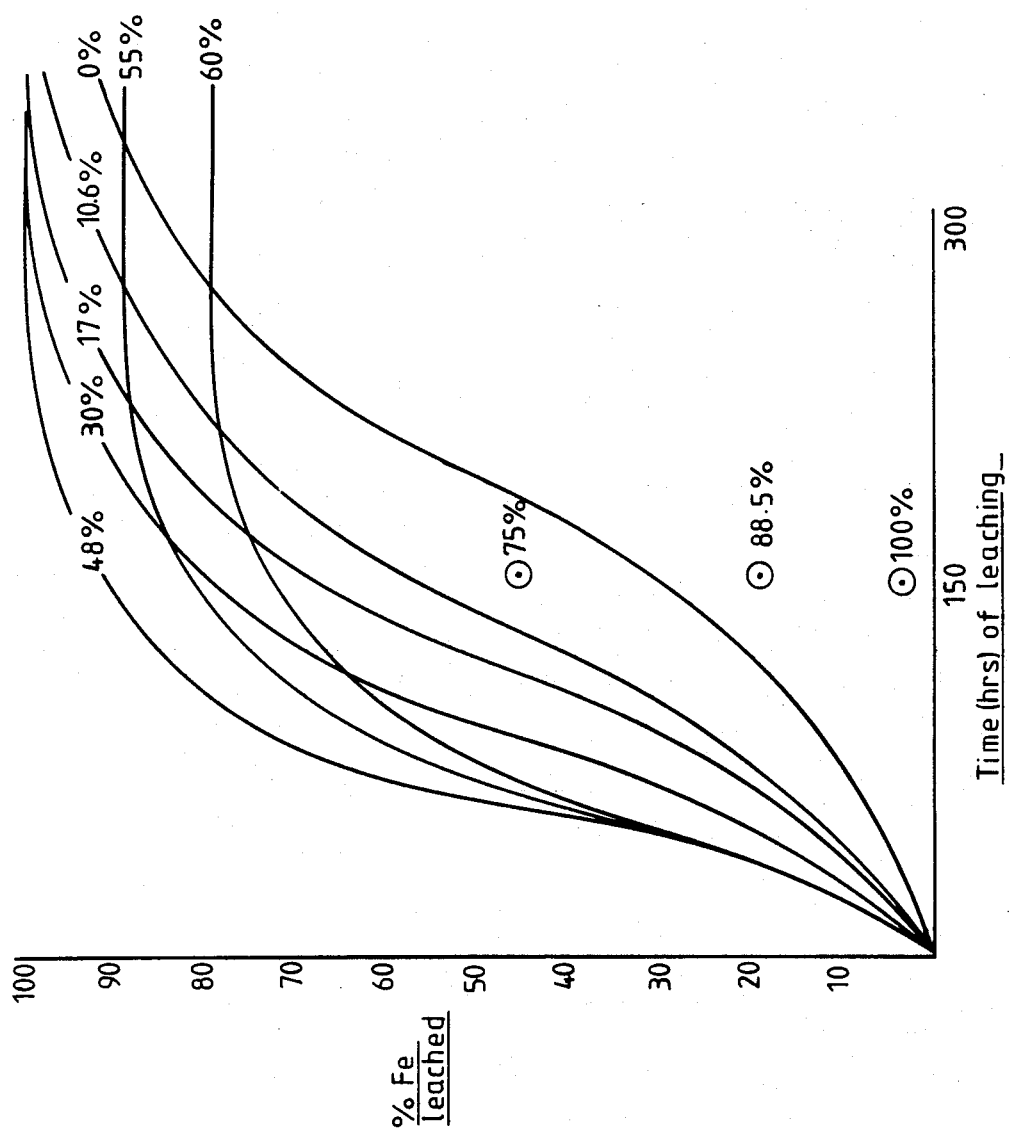

MICROBIAL LEACHING OF SULPHIDE-CONTAINING ORES

This application is a continuation-in-part of U.S. application Ser. No. 365,958 filed on June 4, 1982, now abandoned, and relates to an improved method of extracting metals from ores or concentrates containing sulphide.

The phenomenon of the leaching of metals from mine workings and waste dumps has been known for very many years, and since about 1950 the role of bacteria in such dissolution of metals from ores has been extensively investigated. Bacteria of the genus Thiobacillus, particularly T.ferro-oxidans, are known to be capable of leaching iron, copper and other metals from sulphide ores. The bacteria has to be in active growth and for such growth the bacteria derive energy from oxidation in an acid environment of low-valency inorganic sulphur compounds present in the ore or of elemental sulphur produced from the ore.

The precise mode of action of the bacteria in leaching metals from sulphide ores is still not fully understood. The main mechanisms proposed include a direct attack in which sulphide is oxidised by bacterial enzyme systems and an indirect attack in which dissolution is accomplished by ferric ions, the resultant ferrous ions then being reoxidised to ferric ions by bacterial action. It is likely that both types of attack take place.

It is known that oxidation of sulphide ore by ferric ions results in the deposition of elemental sulphur and that formation of a film of this sulphur on the particles of ore impedes further chemical leaching. It has been suggested that bacteria could be used to oxidise this sulphur, so removing the impedance to chemical leaching and at the same time forming sulphuric acid necessary for the chemical leaching.

The bacteria are active at pH values between 1.5 and 3.5 but in leaching at values above 2.5 ferric iron tends to precipitate, for example in the form of the highly insoluble jarosite, a basic ferric sulphate containing potassium or sodium. Blinding of the surface of the ore by such a precipitate would impede further leaching.

It has also been known for many years that the process of chemical leaching of sulphide ores, for example by acids, could be improved by first roasting the ore to remove part of the sulphur present in the sulphide. However, if such a pre-roasting were carried out prior to bacterial leaching it could be expected to adversely affect the leaching action because (i) it would remove part of the sulphur energy source required for active growth of the bacteria and (ii) if less sulphur is available for oxidation by the bacteria less acid would be produced and at the resultant higher pH values precipitation of impeding ferric iron compounds could be expected. In fact, it has been proposed to add elemental sulphur to pyrite being bacterially leached in order to increase acid production.

Because of its economic significance various modifications have been proposed to improve the efficiency of the process of bacterial leaching of ores, either by speeding it up or by improving the degree of extraction of metals. These include treating fine particles of ore (which term is used hereinafter to include concentrate and mixtures of ores and/or concentrates) in suspension in a medium comprising the bacteria, enriching with carbon dioxide the air used to maintain the suspension and adding a surfactant to the medium.

I have now found quite unexpectedly that the efficiency of the process of microbial leaching of sulphide ore is improved when the sulphide ore is given a preliminary roasting to remove part of the sulphur present as sulphide. Since the sulphide is a source of energy for the bacteria and a source of acid for the leaching process, this improvement on removing part of the source is surprising.

The improvement not only increases the degree of extraction of metals such as copper, zinc and tin, but also makes it possible to extract precious metal such as silver, even when present in minor proportions, and to effectively treat ores containing impurities such as arsenic which have previously been untreatable by ordinary processes of extraction. The improved process may make it unnecessary to prepare concentrates since it can be applied to ores containing a major proportion of gangue. It can also be applied to processes of upgrading ores by leaching out some of the undesired associated constituents such as iron, sulphur and arsenic.

Another feature of the improvement in efficiency is the higher rate of extraction of metals.

Most ores contain a proportion of sulphide in the form of pyrite ($FeS_2$) and though bacterial leaching can be carried out on ores containing as little as 1% pyrite, it is preferred to apply the process of this invention to ores containing at least 10% pyrite. When the ore initially contains less than 10% pyrite the proportion can be raised by a preliminary upgrading or by adding a sulphide-rich ore. Addition of sulphide ore is particularly effective when initially the ore to be treated contains ores which do not provide a good growth substrate for the bacteria, e.g. oxides such as tin oxide.

The preliminary roasting of the ore involves heating it to a temperature of not more than 900° C., preferably in the absence of oxygen or under reducing conditions, to remove part of the sulphur present in the sulphide. The minimum temperature required to do this depends on the form in which the sulphide is present. For some ores it may be as low as 450° C. but more usually a temperature in the range 600°–900° C. is suitable.

Normally, roasting of sulphide ores prior to extraction of metals takes place at a temperature of 800° to 900° C. under oxidising conditions and has as its objective the conversion of sulphide to oxide so that, for example, pyrite contained therein is converted to ferric oxide by substantially complete removal of sulphur. In contrast the primary objective of the roasting stage in the process of the present invention is to remove only part of the sulphur without, so far as is possible, producing metal oxide. In the case of pyrite contained in sulphide ore, the objective is to convert part of it to pyrrhotite ($FeS_{1+x}$ where x is in the range 0.1 to 0.7). On a large scale it would be very difficult to convert all the pyrite to pyrrhotite without producing a significant amount of oxide, and this is undesirable.

Many metal ores contain pyrite in sufficient proportion to achieve the improvement of this invention. When the ore of interest is an oxide which itself provides a poor growth substrate for the bacteria, it may be associated with pyrite in such a proportion that its treatment, either by way of extraction of the metal or by way of upgrading the ore, may be improved by preliminary roasting in accordance with this invention. If the sulphide content is low or negligible, then as described above, pyrite may be added, either as such or in the form of a sulphide-rich ore, to raise the content to at least the required overall proportion in the charge to be roasted.

The proportion of pyrite in the ore to be roasted is preferably in the range 10–70% wt. of the ore, the optimum proportion depending on the nature and proportion of the metals in the ore.

It is essential, as described above, that the roasting should not eliminate all the sulphur present in the sulphide. At least 10% of the sulphur in the pyrite should be removed. A suitable upper limit depends on the nature of the ore and the roasting conditions: in the case of pyrite up to 50% of the sulphur could be removed by very carefully controlled roasting without significant production of oxide but this is not likely to be possible on a large scale. As a useful approximate guide a weight loss of sulphur corresponding to 10 to 25% by weight of the sulphide is adequate in most cases. The roasting may be carried out under mild oxidising conditions but preferably, in order to reduce the risk of excess oxidation, the roasting may be carried out under a blanket of non-oxidising gas, or a reducing agent such as coal or carbon may be added to the roasting charge.

A benefit of the process of this invention is illustrated with reference to the accompanying drawing which shows the rate-of-leaching curves for a pyrite concentrate which has been pre-roasted to remove a range of proportions of sulphur. The roasting was carried out at 650° C. under reducing conditions. The initial sulphur content of the pyrite concentrate was 52% and the figure on each curve indicates the percentage of the sulphur content removed in the pre-roasting. As stated above it is desirable not to remove so much sulphur as to produce the oxide; the objective is to produce pyrrhotite. By careful control of the roasting it is possible on a small scale to remove about 50% of the sulphur without producing significant quantities of oxide which the bacteria cannot leach. The leaching was carried out using an aerated aqueous suspension of Thiobacillus ferro-oxidans at a temperature of 35° C. and a pH of 1.8 to 2.0. From the drawing it can be seen that the rate of leaching of iron from the concentrate increases as the proportion of sulphur removed increases up to 48%. However, at the higher percentages of 55% and 60% the rate of leaching and the final proportion of iron leached falls off as a result of production, in the roasting process, of iron oxide. Three additional points show the effect of removal of 75%, 88.5% and 100% removal of sulphur by pre-roasting.

Iron is readily extractable from sulphide ores, and more quickly by the present invention but a further advantage is that the extraction of other metals from ores such as those containing copper, zinc, tin and silver is improved.

For example, the copper-bearing ore enargite is usually associated with pyrite from which it normally is separated before extracting copper. However, when using this invention the pyrite can be left in the ore and after the preliminary roasting, the efficiency of extraction of copper is improved. This extraction of copper from enargite (which also contain arsenic) is preferably carried out in the present of more than 50% pyrite in the ores to be treated. Also by way of example, the extraction of zinc from sphalerite using this invention is preferably carried out in the presence of about 25% sulphide. Some sphalerite ores are rich in pyrite but others are poor and in the latter case, it may be desirable to add pyrite before the preliminary roasting. Further, the extraction of copper and zinc from chalcopyrite using this invention is preferably carried out in the presence of about 40–50% of sulphide and the process may be used either to leach the copper and zinc or to upgrade the copper-and zinc-containing ore by removal of iron and other associated elements. In another upgrading process, the separation of cassiterite from associated sulphide, usually 15–30% of pyrite, is facilitated by the process of the present invention in that the iron content is more readily leached.

Where sulphide is added it is preferred to add pyrite since this ore is readily available and provides a good substrate for the bacteria. In fact, good use can be made of a high pyrite addition if it also carries precious metals such as silver and gold.

The ore may be crushed and ground before the roasting treatment or the grinding step may be carried out after roasting, since the roasting of some ores may facilitate grinding.

The microbial leaching may be by any of the known methods, such as percolation, but is preferably carried out in a suspension of fine particles of the ore in an acidic aqueous medium containing the bacteria. For a percolation leach the ore should be ground to a particle size not greater than 2 mm and for a suspension leach to a particle size not greater than 0.125 mm.

In a suspension leach the medium containing preferably 10 to 40% by weight of solids may be stirred mechanically or by aeration at a temperature in the range 25° to 40° C. The pH value of the medium is preferably in the range 1 to 3. The pH value may be adjusted by addition of sulphuric acid and this may have been produced from the sulphur removed in the preliminary roasting stage. If it is desired to remove from the leach liquid some of the iron which has been extracted, the pH of the liquid is preferably adjusted to be above 2.4 so that some of the iron is precipitated as hydroxide. An advantage of the improved process is that if the ore contains arsenic this need not be removed by roasting, but can be dealt with in the leaching stage where it can be precipitated in disposable form as ferric arsenate.

The medium should also contain the usual nutrients for the bacteria either derived from the ore or added as such. It is important that the bacteria should be multiplying during the leaching process which may be carried out usually for a period of between 180 and 300 hours.

This time, temperature and solids content of the leaching stage can be adjusted according to the product and the degree of extraction required from any particular ore. The leach may be carried out in a single stage or in multiple stages. The optimum leach conditions will vary with the scale of the operation.

The strain of T. ferro oxidans used in the process is preferably one which has been adapted to the metals, in addition to iron, which it is desired to leach.

At the end of a suspension leaching stage the stirred medium is run off into settling tanks, or preferably cones, where the coarse solids are allowed to settle as sludge. The liquor, which still contains bacteria and fines in suspension, is separated from the sludge and a portion may be retained for seeding further suspension leaching processes. The remainder is clarified to remove the fines, and the clarified liquor which may contain up to 95% of the copper or zinc present in the original ore may be subjected to the usual processes of recovering metals present in solution. The clarified liquor may also contain a substantial proportion of the iron from the ore together with arsenic if it was present.

The fines contain, in addition to fine particles of ore, the bacteria used in the leaching stage and it is an unexpected feature of the process of this invention as applied to silver-containing ores that the bacteria, which have been used in the leaching stage and recovered in the fines, carry in a surface film a high proportion of the silver contained in the ore. In the form of these fines, the silver is readily recoverable by normal cyanide processes. This can be done even when the original ore contained "poisons" for the cyanide which would have rendered impossible cyanide treatment of the ore itself, for example as in some tin-bearing ores such as cassiterite. Silver and gold may also be present in the sludge in the form of particles of the metal and this also may be recovered by cyanide extraction.

The invention is illustrated by the following examples:

EXAMPLE 1

A sulphide ore containing pyrite (about 66% by wt), tin, oxide and silver upgraded by gravity concentration was treated by first mixing the ore with charcoal and roasting for one hour at 750° C. to remove about 15% of the sulphur from the sulphide mineral present. The roasted ore was then subjected for 250 hours to a bacterial leach. The leach was started with $10^7$ to $10^9$ cells of Thiobacillus ferro oxidans per liter of leaching medium at a pH of 1.8 to 2.0 and was run for 250 hours at a temperature of 35° C. The majority of the metals contained in the ore were leached into solution with the exception of tin and silver, which were enriched in the residue. Also contained in the residue was elemental sulphur which was then removed by melting or solvent extraction or by an oxidising roast in the form of sulphur dioxide. The result of the treatment produced a final residue enriched in tin and silver. The silver was recovered from the fines and residue by a cyanide leach.

| | |
|---|---|
| Approximate analysis of ore before treatment | 35% Fe, 5% Zn, 0.5% Cu 9.5% Sn, Ag 1.8 Kg/TONNE |
| Approximate analysis of solid residue after treatment | 30% Sn, Ag 5.4 Kg/TONNE |
| % of metal recovered in the bacterial leach solution | Zn 92%, Cu 90%, Fe 90% Sn 0% |

By this improved process, most of the zinc and copper is recovered in solution and the tin-bearing ore is substantially upgraded.

A similar result was obtained when the roasting was carried out at 650° C. for 1½ hours.

EXAMPLE 2

A complex copper sulphide flotation concentrate containing pyrite (about 25% by wt), copper, zinc, iron and arsenic and also silver was treated first by roasting at 750° C. under reducing conditions as described in Example 1 to remove about 15% of the sulphur and some arsenic. The roasted concentrate was then subjected to a bacterial leach as in Example 1 and this resulted in extraction of the majority of the metal with the exception of silver which was enriched in the residue, this silver being recovered by a cyanide leach.

| | |
|---|---|
| Approximate analysis of the concentrate before treatment | 20% Cu, 3.2% Zn, 13% Fe |
| Approximate analysis of solid residue after treatment | 1.2% Cu, 0.85% Zn, 17% Fe Ag 3.27 Kg/TONNE |
| % of metal recovered in the bacterial leach solution | Cu 97%, Zn 91%, Fe 50% |

EXAMPLE 3

A complex sulphide flotation concentrate containing zinc, copper and iron was mixed with 25% by weight of pyrite and prepared by roasting under reducing conditions as in Example 1 to remove about 15% of the sulphur content. The roasted ore was then subjected to a bacterial leach as described in Example 1 which resulted in the extraction of the majority of the metals.

| | |
|---|---|
| Approximate analysis of the concentrate before addition of pyrite | 19.8% Zn, 7.9% Cu, 14.6% Fe |
| Approximate analysis of solid residue after treatment | 4.8% Zn, 1.87% Cu, 9.5% Fe |
| % of metal recovered in the bacterial leach solution | Zn 90%, Cu 90%, Fe 80% |

EXAMPLE 4

A similar concentrate to that used in Example 3 was roasted at 750° C., one portion of it under normal oxidising conditions and a second portion of it after mixing it with coal and 25% by weight of pyrite. In the roasting of the second portion about 15–20% of the sulphur content of the mixture was removed. Both portions were then separately subjected to a bacterial leach as described in Example 1.

The % extraction in the leach was as follows:

| | % extraction | | |
|---|---|---|---|
| | Zn | Cu | Fe |
| Roasted at 750° C. | 53.6 | 44.6 | 58.3 |
| Roasted with added pyrite and coal | 79.0 | 85.0 | 70.7 |

EXAMPLE 5

Bolivian sulphide ore having a head assay of Zn 0.13%, Cu 7.25%, Fe 35% was roasted at 700° C. for one hour under non-oxidising conditions. The weight loss was 13% (S loss about 13.5% of sulphide). The roasted ore was leached for 250 hours by a process as described in Example 1. By way of comparison, an unroasted sample of the ore was leached in the same way. The result of the leaching was:

| | % Extraction | | |
|---|---|---|---|
| | Zn | Cu | Fe |
| Roasted ore | 67.2 | 93.9 | 74.9 |
| Un-roasted ore | 53.8 | 19.0 | 11.7 |

EXAMPLE 6

A Dominican sulphide concentrate having a head assay of Fe 22.3%, Cu 0.8% and Zn 0.59% was mixed with coal and roasted for one hour at 650° C., the weight loss being 5% (10% S of sulphide). The roasted concentrate was leached for 180 hours by a process as described in Example 1. For the purpose of comparison, an un-roasted portion of the concentrate was leached in the same way but for 500 hours.
The result of the leaching was:

|  | % Extraction | | |
|---|---|---|---|
|  | Zn | Cu | Fe |
| Roasted concentrate | 100 | 100 | 95.4 |
| Un-roasted concentrate | 65.6 | 100 | 82.7 |

EXAMPLE 7

A Bolivian sulphide ore having a head assay of Zn 4.86%, Cu 4.5% and Fe 27% was roasted under a blanket of non-oxidising gas for one hour at 650° C. The weight loss was 9.7% (sulphur loss about 14% of sulphide). The roasted ore was leached by a process as described in Example 1 and by way of comparison an un-roasted sample of the ore was leached in the same way. The result of the leaching was:

|  | % Extraction | | |
|---|---|---|---|
|  | Zn | Cu | Fe |
| Roasted ore | 100 | 96.5 | 97.6 |
| Un-roasted ore | 95.7 | 29.1 | 89.8 |

An important feature of this invention is the possibility of highly efficient extraction of silver and gold from ores. This is achieved not by cyanide extraction of the un-roasted or pre-roasted ore but by cyanide extraction of the residue of the microbial leaching of the ore after pre-roasting. This is illustrated in the following Example:

EXAMPLE 8

A milled sample of a silver-bearing sulphide ore was divided into four smaller samples A, B, C and D.

Sample A was left untreated

Sample B was roasted to remove 20% of the sulphur present in the sulphide.

Sample C was bacterially leached for 200 hours, the sludge and fines then being recovered.

Sample D was roasted to remove 20% of the sulphur present in the sulphide (under the same conditions as Sample B) and was then bacterially leached for 200 hours (under the same conditions as Sample C), the sludge and fines then being recovered.

Sample A and the products of so-treated samples B, C and D were then leached with sodium cyanide under identical conditions as follows:

| Solids content | 10% |
|---|---|
| pH (achieved with lime) | 10.5 |
| Temperature | 35° C. |
| Shaken at | 150 rpm |
| Duration of test | 24 hours |
| Solution concentration | 0.25% |

The silver taken into solution was then measured using atomic absorption spectroscopy.

The % extraction of silver from the untreated sample A and the treated samples B, C and D was:

| Sample | % Ag extracted |
|---|---|
| A | 0.11 |
| B | 0.11 |

| Sample | % Ag extracted |
|---|---|
| C | 0.13 |
| D | 86.7 |

These results clearly show that the process of this invention provides a high degree of extraction of silver which is quite unobtainable by cyanide treatment of (i) the untreated ore, (ii) the roasted ore or (iii) the ore which is bacterially leached without preliminary roasting.

Any gold present in the ore can similarly be efficiently recovered by treatment of the sludge, in which it will be present in the form of particles of the metal, by cyanide extraction.

I claim:

1. A process of extracting metals from a material containing at least 10% by weight of pyrite and selected from the group consisting of ores containing sulphide, concentrates of such ores and mixtures of such ores and/or concentrates by microbial leaching which comprises roasting the material before said microbial leaching to convert part of the pyrite to pyrrhotite and thus remove part of the sulphur which is present as pyrite with substantially no metal oxide formation, the conversion corresponding to removal of at least 10% but not more than 50% of the sulphur present in the pyrite, and only thereafter leaching the thus roasted ore by treatment with bacteria, to extract said metals.

2. A process as claimed in claim 1 in which said material contains from 10 to 70% by weight of pyrite.

3. A process as claimed in claim 1 in which said material is a mixture containing a component selected from the group consisting of sulphide-rich ores and concentrates of sulphide ores which has been added to raise the pyrite content of said mixture to from 10 to 70% by weight.

4. A process as claimed in claim 1 in which the proportion of sulphur removed corresponds to from 10 to 25% by weight of said sulphide.

5. A process as claimed in claim 1, in which said material is mixed with a member of the group consisting of coal or charcoal before roasting.

6. A process as claimed in claim 1, in which said roasting is carried out under a blanket of non-oxidising gas.

7. A process as claimed in claim 1, in which copper and zinc are extracted in said leaching.

8. A process as claimed in claim 1, in which a tin-bearing ore is upgraded by said leaching and is recovered as a solid residue.

9. A process as claimed in claim 1, in which said material contains silver and after said leaching process, sludge and fines are separated from the leach liquor and treated by a cyanide process to extract silver therefrom.

10. In a process of extracting metals from a material containing at least 10% by weight of pyrite and selected from the group consisting of ores containing sulphide, concentrates of such ores and mixtures of such ores and concentrates in which said metals are leached from said material using an aqueous leaching liquid containing an effective concentration of multiplying bacteria Thiobacillus ferro oxidans, the improvement which comprises subjecting said material before said leaching to a roasting process in which at least 10% but not more than 50% of the sulphur present in said pyrite is removed to convert part of the pyrite to pyrrhotite with substantially no metal oxide formation.

11. In a process as claimed in claim 10 the further improvement in which the proportion of sulphur removed in said roasting process corresponds to from 10 to 25% by weight of said sulphide.

12. In a process as claimed in claim 10, the further improvement wherein said material subjected to said roasting contains from 10 to 70% by weight of pyrite.

13. In a process as claimed in claim 10, the further improvement in which said material is a mixture containing an ore and concentrate of high sulphide content admixed in such a proportion as to raise the pyrite content of said material to from 10 to 70% by weight.

14. In a process as claimed in claim 10, the further improvement in which said material is mixed with a member of the group consisting of coal or charcoal before roasting.

15. In a process as claimed in claim 10, the further improvement in which said roasting is carried out under a blanket of non-oxidising gas.

16. In a process as claimed in claim 10, the further improvement in which copper and zinc are extracted from said material in said leaching.

17. In a process as claimed in claim 10, the further improvement in which a tin-bearing ore contained in said material is upgraded by said leaching and is recovered as a solid residue.

18. In a process as claimed in claim 10, the further improvement in which said material contains silver and gold and after said leaching process, sludge and fines are separated from said leaching liquid and treated by a cyanide process to extract silver and gold therefrom.

19. A process according to claim 1 wherein the roasting is carried out at a temperature of between 450° C. and 900° C. under reducing conditions.

* * * * *